United States Patent [19]

Crivello

[11] Patent Number: 4,677,169
[45] Date of Patent: * Jun. 30, 1987

[54] SILICONE-ORGANIC BLOCK POLYMERS AND METHOD FOR MAKING

[75] Inventor: James V. Crivello, Clifton Park, N.Y.

[73] Assignee: General Electric Company, Schenectady, N.Y.

[*] Notice: The portion of the term of this patent subsequent to Apr. 22, 2003 has been disclaimed.

[21] Appl. No.: 840,168

[22] Filed: Mar. 17, 1986

Related U.S. Application Data

[63] Continuation-in-part of Ser. No. 667,929, Nov. 2, 1984, Pat. No. 4,584,356.

[51] Int. Cl.$^4$ ............................................. C08F 283/12
[52] U.S. Cl. ...................................... 525/479; 528/25; 528/26; 528/32
[58] Field of Search ..................... 525/479; 528/32, 26, 528/25

[56] References Cited

U.S. PATENT DOCUMENTS

| | | | |
|---|---|---|---|
| 3,776,875 | 12/1973 | Getson | 525/479 |
| 4,254,248 | 3/1981 | Friends et al. | 525/479 |
| 4,535,174 | 8/1985 | Crivello | 556/443 |
| 4,584,356 | 4/1986 | Crivello | 525/479 |

FOREIGN PATENT DOCUMENTS 2944591  5/1981  Fed. Rep. of Germany ...... 525/479

OTHER PUBLICATIONS

Multiple-Sequence Block Polymers of Poly(styrene) and Poly(dimethylsilorane), *Polymer Letters*, vol. 8, pp. 677-679 (1970) John Wiley & Sons, Inc.
Noshay and McGrath, *Block Copolymers*, Academic Press, New York, N.Y. (1977) pp. 275-284.

*Primary Examiner*—Wilbert J. Briggs, Sr.
*Attorney, Agent, or Firm*—William A. Teoli; James C. Davis, Jr.; James Magee, Jr.

[57] ABSTRACT

A method is provided for making silicone-organic block polymers, such as polydimethylsiloxane-polystyrene block polymers resulting from the thermal generation of free-radicals in the presence of free-radical polymerizable organic monomer. A silicone prepolymer is used having chemically combined pinacolate groups in the backbone or terminal positions which are capable of generating free-radicals upon thermolysis and which retain chemically combined remnants of such pinacolate diradicals which serve as connecting sites for free-radical polymerized organic blocks.

5 Claims, No Drawings

SILICONE-ORGANIC BLOCK POLYMERS AND METHOD FOR MAKING

BACKGROUND OF THE INVENTION

This application is a continuation-in-part of my copending application Ser. No. 667,929, filed Nov. 2, 1984 now U.S. Pat. No. 4,584,356.

Prior to the present invention, the general method for making silicone-styrene block polymers, as shown by J. Saam et al, U.S. Pat. No. 3,678,125, involved the preparation of a block of polystyrene having terminal organometallic functional groups resulting from anionic polymerization. Silicone blocks were then grown off the ends of the vinyl polymer by means of anionic ring opening of a cyclic siloxane such as hexamethylcyclotrisiloxane. The resulting ABA silicone-organic-silicone block polymer was then coupled to give a multiple sequence block polymer having good mechanical properties.

Although anionic polymerization can provide valuable multiple sequence block polymer, as further taught by J. Saam et al, anionic polymerization has a substantial drawback for making such materials since it requires rigorous exclusion of oxygen, water, as well as other impurities. Ultra-pure monomers must be employed to insure that the organometallic functional groups are preserved during polymerization. An additional disadvantage of anionic polymerization, is that a coupling reaction must be performed in order to obtain microstructures which have good mechanical properties. As a result, silicone-vinyl polymers have not been commercialized.

The present invention is based on my discovery that polyorganosiloxane polymers can be made having chemically combined free-radical precursor groups situated at regular intervals along the polymer backbone which on thermolysis serve as sites for free-radical initiation. As a result, the aforementioned functional oligomers are capable of further chain growth at the site of such chemically combined free radical precursor groups in the presence of vinyl monomers to produce silicone-organic block polymers. Certain halogenated vinyl monomers, such as 4-chlorostyrene, provide silicone-organic block polymers useful as E-Beam resists.

STATEMENT OF THE INVENTION

In one aspect of the present invention, there is provided a method for making silicone-organic block polymers which comprises, (A) initiating in the presence of an organic solvent, the free-radical polymerization of a free radical polymerizable organic monomer by heating a mixture of such free-radical polymerizable organic monomer and a silicone prepolymer having on its backbone or in the terminal position, at least one chemically combined bissilylpinacolate radical capable of forming a free-radical initiator upon thermolysis, (B) recovering a silicone-organic block polymer from the mixture of (A).

In a further aspect of the present invention, there is provided a silicone-organic block polymer comprising the reaction product of a free radical polymerizable organic monomer and a silicone prepolymer having on its backbone, or in its terminal position, at least one chemically combined bissilylpinacolate radical capable of forming a free-radical initiator upon thermolysis.

Some of the silicone prepolymers of the present invention which can be used to make silicone-organic block polymers, can be made in the presence of a platinum catalyst, by effecting reaction between a silicon hydride terminated polydiorganosiloxane of the formula,

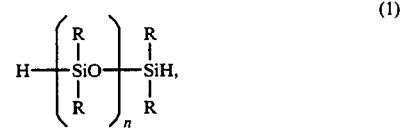

and an aliphatically unsaturated organosilyl-substituted arylpinacol selected from

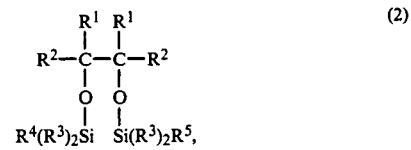

and

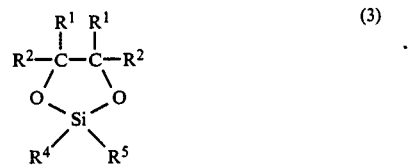

where R is a monovalent radical selected from $C_{(1-13)}$ hydrocarbon radicals and substituted $C_{(1-13)}$ hydrocarbon radicals, $R^1$ and $R^2$ are monovalent radicals selected from $C_{(6-13)}$ aryl hydrocarbon radical and substituted $C_{(6-13)}$ aryl hydrocarbon radical, and when attached to the same carbon atom, $R^1$ and $R^2$ can be joined together to form divalent aryl radicals selected from,

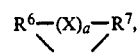

$R^3$ is a monovalent radical selected from hydrogen and R radicals, $R^4$ is selected from $C_{(2-20)}$ monovalent aliphatically unsaturated hydrocarbon radicals, substituted $C_{(2-20)}$ aliphatically unsaturated monovalent hydrocarbon radicals, $C_{(5-20)}$ cycloaliphatically unsaturated radicals and substituted $C_{(4-20)}$ aliphatically unsaturated organic radicals, $R^5$ is selected from $R^3$ radicals and $R^4$ radicals, $R^6$ and $R^7$ are selected from divalent $C_{(6-13)}$ aryl hydrocarbon radicals and substituted divalent $C_{(6-13)}$ aryl hydrocarbon radicals, X is selected from —O—, —S—, —CH$_2$ and

a is 0 or 1, and n is a whole number equal to 1 to 2000 inclusive.

Radicals included within R of formula (1) are for example $C_{(1-8)}$ alkyl radicals such as methyl, ethyl, propyl, butyl, pentyl, hexyl, etc.; substituted $C_{(1-8)}$ alkyl radicals such as cyanoethyl, cyanobutyl, trifluoropropyl; aryl radicals such as phenyl, tolyl, xylyl, naphthyl; substituted $C_{(6-13)}$ aryl radicals such as methoxyphenyl, chlorophenyl, nitrophenyl, chloronaphthyl, etc. Radicals included within $R^1$ and $R^2$ of formula (2) and (3) are, for example, phenyl, xylyl, tolyl, napthyl, chlorophenyl, nitrophenyl, methoxyphenyl, etc. Radicals included within $R^4$ of formula (2) are, for example, vinyl, alkylvinyl, such as methylvinyl, allyl, etc., cyclopentenyl, cyclohexenyl, nadic, etc. Radicals included within $R^6$ and $R^7$ are, for example, phenylene, xylylene, naphthylene, tolylene, and substituted derivatives thereof.

The aliphatically unsaturated triorganosilyl substituted aryl pinacoles which can be used in the practice of the present invention to make silicone prepolymers are shown in U.S. Pat. No. 4,535,174 and are incorporated herein by reference. These aliphatically unsaturated triorganosilyl substituted aryl pinacoles can be made by effecting reaction between an appropriate ketone with an aliphatically unsaturated monohalosilane in the presence of an active metal reducing agent such as magnesium, as shown by the following equation

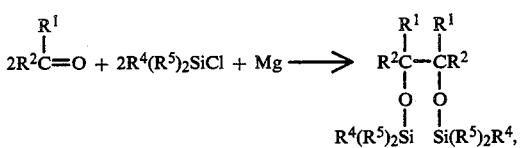

where $R^1$, $R^2$, $R^4$ and $R^5$ are as previously defined.

A similar procedure can be used for preparing cyclic silicone containing pinacolates which require the employment of a dihalo aliphatically unsaturated silane in combination with a ketone as shown by the following equation

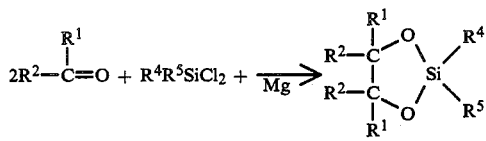

where $R^1$, $R^2$, $R^4$ and $R^5$ are as previously defined.

Silicone prepolymers which can be used to initiate the polymerization of the free-radical polymerizable organic monomer can be made by effecting the transition metal catalyzed addition of silicone hydride of formula (1) consisting essentially of chemically combined diorganosiloxy units and aliphaticaly organosilyl pinacolate radicals of formulas (2) or (3) as shown by the following, where m is a positive integer:

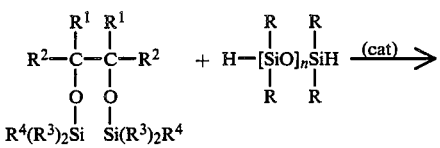
(5)

-continued
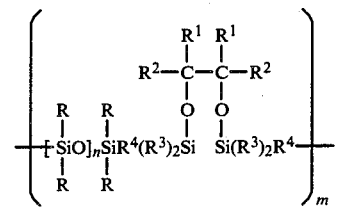

and R, $R^1$, $R^2$, $R^3$ and $R^4$ are as previously defined.

A typical reaction scheme of making the silicone-organic block polymers in accordance with the practice of the method of the present invention can be illustrated as follows, where a free radical fragment is formed from a silicone prepolymer segment included within formula (5) and M is a vinyl or diene monomer:

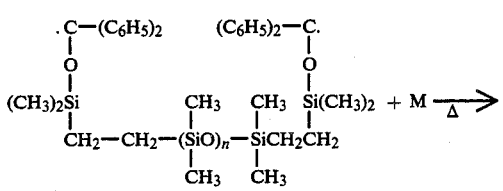

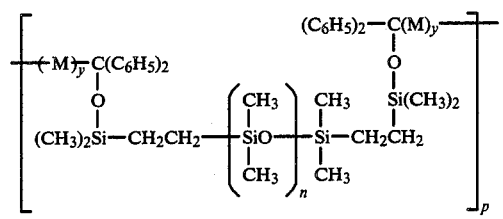

where n, y and p are positive integers having a value of from about 1 to 2000, inclusive.

The silicone prepolymer of formula (5) is thermally labile and when heated to temperatures above 40° C. in the presence of vinyl monomer initiates their free-radical polymerization. Typical vinyl monomers which can be polymerized in this manner are, for example, styrene, methylmethacrylate, ethylacrylate, acrylonitrile, methacrylic acid, maleic anhydride, butadiene, isoprene, butylacrylate, diethylfumarate, p-chlorostyrene, ethyl vinyl ether, vinyl acetate, n-vinyl carbazole, N-vinylpyrrolidone, vinyl naphthalene, lauryl acrylate, acrylic acid, methyacrylonitrile, vinyl methyl sulfone, 4-vinylbenzene sulfonic acid, etc., and mixtures thereof.

Additional vinyl monomers which can be used in the practice of the present invention to provide silicone-organic block polymers useful for E-Beam resists are, for example,
4-bromostyrene
2,4-dibromostyrene
2,4,6-tribromostyrene
4-iodostyrene
4-chlorostyrene
4-chloromethylstyrene
2-chloro-4-iodostyrene
2-methoxy-4-iodostyrene
4-iodo-1-vinylnaphthalene
2-chloroethylmethacrylate
2-bromoethylmethacrylate
2,2,2-trichloroethylmethacrylate The polymerization can be facilitated by the use of an organic solvent such as toluene, benzene, xylene, acetonitrile, water, methylene chloride, nitromethane, ethyl benzene, dimethylformamide, acetic acid, chlorobenzene, nitrobenzene, etc.

Transition metal catalysts which can be used in the practice of the present invention to make the silicone prepolymers are preferably platinum catalysts, for example, platinum complexes of unsaturated siloxanes, as shown by Karstedt U.S. Pat. No. 3,775,442, Ashby U.S. Pat. Nos. 3,159,601 and 3,159,662 and Lamoreaux U.S. Pat. No. 3,220,972, assigned to the same assignee as the present invention. An effective amount of a platinum catalyst is about $10^{-4}\%$ to 0.1% by weight of platinum, based on the weight of curable hydrosilation mixture. An effective amount platinum catalyst is an amount sufficient to provide from 0.001 to 5% platinum, based on the weight of the mixture.

The micro-structure of the resulting silicone-organic block polymers may be modified by introducing branching into the chains. This may be readily accomplished by the use of olefinic branching agents to produce branched prepolymer. Some of the branching agents which are useful for this purpose are, for example, triallylisocyanurate, 1,3,5-triallylbenzyltricarboxylate, glycerol triallylether, etc.

The silicone-organic block polymers which can be made in the practice of the present invention can be recovered by standard procedures such as precipitation after polymerization into a suitable organic solvent such as methanol, hexane, etc. Standard extraction techniques also can be used if desired. These silicone-organic block polymers can be used in a variety of applications such as thermoplastic elastomers, thermoplastics, impact modifiers, surface active agents, mold release agents, membranes, controlled release drug carriers, packaging, medical tubing, biomedical prothesis, etc.

In order that those skilled in the art will be better able to practice the invention, the following examples are given by way of illustration and not by way of limitation. All parts are by weight.

EXAMPLE 1

A mixture of 2177 grams (9.806 mole) of octamethylcyclotetrasiloxane, 16.75 gram (0.125 mole) of 1,1,3-3-tetramethyldisiloxane and 12 grams of Filtrol 20 acid treated clay was equilibrated at 60° C. for 20 hours utilizing a stirrer, reflux condenser and drying the tube. The equilibrated mixture was then allowed to cool and was filtered through a sintered glass funnel to remove the clay. The reaction mixture was stripped of volatiles at 130°-140° C. at approximately 0.1 torr. There was obtained a viscous oil having a number average molecular weight of 9894 grams per mole as determined by $^{29}$Si NMR which correspond to a DP=133.7.

There was added dropwise 60.5 grams (0.5 mole) of dimethylvinylchlorosilane to a mixture while it was being stirred 91.0 grams (0.5 mole) of benzophenone, 6 grams (0.25 mole) of magnesium metal (30 mesh), 250 ml of dry tetrahydrofuran and 15 ml of tetramethylurea. An exothermic reaction was noted with the temperature rising gradually to 50° C. The reaction mixture was kept at this temperature with the aid of a water bath. After the exothermic portion of the reaction had subsided, the reaction mixture was heated to 47° C. for 4 hours and then allowed to stand at room temperature overnight. The solvent was removed with the aid of a rotary evaporator. The resulting yellow oil was dissolved in chloroform. The inorganic precipitate was removed by filtration and the product obtained was recrystallized twice from ethanol. A 43.1% yield of colorless product (56.3 g) was obtained having a melting point of 135°-140° C. The product was benzopinacole bis(dimethylvinylsilyl)ether having the formula

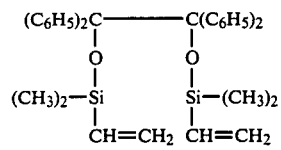

The identity of the compound was confirmed by elemental analysis; Calculated: C; 76.40%, H; 7.12%, Si; 10.49%. Found: C; 75.9%, H; 7.20%, Si; 10.70%.

There were added 10 microliters of a platinum-siloxane complex shown in Karstedt, U.S. Pat. No. 3,715,334, to a mixture of 22.6 grams (0.005 mole) of linear polydimethylsiloxane having an average of 61.3 dimethylsiloxy units and chain terminated with dimethylhydrogensiloxy units, 2.674 grams of the above silylpinacolate and 20 ml. of toluene under a nitrogen atmosphere with stirring. The reaction mixture was stirred at 50° C. for 4 hours. During this time, the viscosity of the solution was observed to undergo a marked increase. To the plate yellow solution there was then added 50 grams of distilled styrene monomer and the reaction temperature raised to 110° C. During the course of this portion of the reaction, the color of the solution became pink and the viscosity increased. The total heating time at 110° C. was 4 hours. The polymer solution was diluted with toluene and then precipitated into methanol to give a fibrous polymer. After drying the polymer for a period of about 8 hours in vacuo, there was obtained 46.7 g of the material representing a 62% yield. Based on method of preparation, the material was a silane-polystyrene block polymer. Gel permeation chromatography indicated that the molecular weight of the block polymer was 190,000 grams per mole. Flexible, transparent thermoplastic films were obtained when the silicone-polystyrene block polymer was cast from methylene chloride. Films were also molded from the silicone-polystyrene block polymer in a press at 150° C.

EXAMPLE 2

A solution of 22.68 grams (0.005 mole) of the silicone hydride terminated polydimethylsiloxane of Example 1 and 20 ml of toluene was refluxed for 1 hour under nitrogen utilizing a calcium hydride drying trap to dry the mixture. The temperature of the mixture was then reduced to 25° C. and 2.674 grams (0.005 mole) of the bis dimethylvinylsilylpinacolate of Example 1 was added along with 5 microliters of the platinum-siloxane catalyst of Example 1. The reaction mixture was heated to 50° C. for 2 hours and an additional 5 microliters of the platinum-siloxane catalyst was added. After a total reaction time of 4 hours, 40 grams of styrene monomer was added and the reaction mixture was heated to 110° C. for 2 hours. The reaction mixture was diluted with toluene and then poured into methanol. A fibrous precipitate resulted. Based on method of preparation, the precipitate was a silicone-polystyrene block polymer. The fibrous polymer was redissolved in methylene chloride and once again precipitated into methanol. After drying the silicone-polystyrene block polymer in vacuum for about 8 hours, there was obtained a 40.94 grams of the silicone-polystyrene block polymer which has a 62.6% yield. GPC analysis of the silicone-polystyrene block polymer showed that it had a number average molecular weight of 219,300 grams/mole.

EXAMPLE 3

The procedure of Example 2 was repeated, except that there was utilized 24.73 grams (0.0025 mole) of a silicon hydride terminated polydimethylsiloxane having an average molecular weight of 9894 grams/mole and there was used 1.337 grams (0.0025 mole) of the silylpinacolate of Example 1 and 5 microliters of the platinum-siloxane catalyst. After 1 hour at 50° C. there was added 40 grams of styrene monomer and the temperature slowly brought to 110° C. A rubbery polydimethylsiloxane-polystyrene block polymer was obtained after 4 hours of polymerization which provided an elastomeric film at 120° C. in a Carver press. The number average molecular weight as determined by GPC analysis of the silicone-polystyrene block polymer in toluene was 349,900 grams/mole. It had a glass transition temperature of 98° C. indicating the presence of styrene blocks in the material.

EXAMPLE 4

The procedure of Example 2 was repeated utilizing 24.74 grams of the silicon hydride terminated polydimethylsiloxane and 1.337 grams of vinylpinacolate of Example 1 followed by 5 micro liters of the platinum-siloxane catalyst. After 4 hours of stirring at 50° C. there was added to the mixture 50 ml of freshly distilled acrylonitrile. The reaction temperature was raised to 70° C. to initiate the free-radical polymerization. After 2 hours, the reaction mixture had become so viscous that the stirrer had stopped and the reaction was discontinued. A horny white polymeric mass was obtained which swelled in hot butyrolactone and was precipitated into methanol. After repeated washings with methanol, the polymer was filtered and then dried in a vacuum oven overnight at approximately 60° C. Attempts were made to press the polymer into a film at 180°–200° C. The polymer showed some fusion and flow. The yield of the polymer was found to be 41.9 grams.

EXAMPLE 5

A multiple sequence silicone-organic block polymer was prepared by initially drying 24.73 grams of a silicon hydride-terminated polydimethylsiloxane fluid having a number average molecular weight of 9894 grams/hole and 20 ml of thiophene-free benzene under a nitrogen atmosphere and using a calcium hydride drying trap. Benzene was refluxed through the calcium hydride drying trap for 1.5 hours to dry the reaction mixture. The temperature of the reaction mixture was then reduced to 50° C. and 1.337 grams of the vinylpinacolate initiator of Example 1 was added followed by 5 microliters of the platinum-siloxane catalyst. After 1.5 hours, the reaction mixture had become quite viscous as the molecular weight of the prepolymer increased. There was then added 2 grams of acrylic acid dissolved in 13 grams of styrene. The reaction mixture was brought to 80° C. After 21 hours, the reaction mixture was extremely viscous and the stirring was no longer possible. There was obtained an elastomeric material which has placed in methanol and cut up into small pieces. The resulting product was then extracted with methanol for 6 hours to remove residual unreacted monomers. The polymer was then dried overnight in vacuo at 40° C. There was obtained 34 grams (82% theory) of a highly elastomeric and tough material. Based on method of preparation, the material was a multi-sequence poly[styreneacrylic acid-dimethylsiloxane] block terpolymer The multiple sequence silicone organic block terpolymer was found to be insoluble in toluene, methylene chloride and tetrahydrofuran, but was soluble in a mixture of 1,2-dimethoxy ethane and methanol. Elastomeric films were cast from the aforementioned solvent. In addition, the dry terpolymer could be compression molded.

EXAMPLE 6

To 24.73 grams of the hydride terminated polydimethylsiloxane fluid described in Example 5, there were added 4 ml toluene and the reaction flask fitted with a condenser, paddle stirrer, thermometer nitrogen inlet and a $CaH_2$ water tap. The reaction mixture was heated to reflux and maintained at that temperature for 2 hours until drying was completed. Then 1.68 grams (0.0025 mol) bis(methylphenylvinylsilyl)benzopinacolate was added to the reaction mixture held at 40° C. Then, there were added 8 microliters of platinum-siloxane catalyst and the reaction mixture stirred for 1 hour before another 8 microliters of platinum-siloxane catalyst was added. After 20 minutes the reaction viscosity was so high that the prepolymer began to climb the stirrer and stirring was discontinued. The reaction mixture was allowed to stand for an additional 1 hour and 10 minutes. Next, there were added 50 grams of styrene monomer and the reaction mixture stirred to dissolve the prepolymer. The temperature was raised to 100° C. and polymerization was carried out for a total of 12 hours at this temperature. The tough polymer was cooled and dissolved in methylene chloride then precipitated into methanol, chopped in a Warring Blender and then dried overnight at 60° C. in vacuo. There was obtained 66.1 grams (95%) of a block polymer which could be cast into tough transparent films from methylene chloride. The block polymer has a number average molecular weight of 95,400 grams/mol.

EXAMPLE 7

The procedure of example 6 was repeated except that the silyl pinacolate initiator was 1.3534 g (0.0025 mol) bis(dimethylvinylsilyl)fluorenone pinacolate. Polymerization was conducted at 120° C. for 12 hours. The polymer was isolated as described previously. There was obtained 63.9 grams (82.8%) of the block polymer after drying overnight at 60° C. in vacuo. The polymer having a number average molecular weight of 99,500 g/mol as determined by gel permeation chromatography could be cast from methylene chloride into brittle translucent films.

EXAMPLE 8

There were added to a 100 ml resin kettle equipped with a reflux condenser, $CaH_2$ trap, nitrogen inlet, thermometer and paddle stirrer, 24.73 g of a α,ω-hydrogen functional polydimethylsiloxane oligomer having a number average molecular weight 9894 g/mol and 4 ml toluene. The reaction mixture was dried by refluxing it for 2 hours. The reaction mixture was then cooled to 40° C. There were added with stirring, 1,369 g bis(dimethylvinylsilyl)benzopinacolate and 8 μL of platinum-siloxane catalyst. The reaction mixture was held at 40°

C. for two hours, to form a benzopinacolate containing polydimethylsiloxane prepolymers.

There were added to the above prepolymers 35 g 4-bromostyrene and 20 ml toluene. The temperature of the resulting mixture was slowly raised to 100° C. The mixture was stirred at this temperature for 12 hours. The mixture was cooled and the product was dissolved in dichloromethane. Based on method of preparation, there was obtained a fibrous block polymer upon precipitation of the solution into methanol. The polymer was recovered by filtration, washed thoroughly with methanol and then dried overnight in vacuo at 60° C. There was obtained, a 55.47 g yield, amounting to 90.8% theory of block polymer. NMR analysis confirmed that the polymer consisted of 60% polydimethylsiloxane and 40% poly-4-bromostyrene by weight. GPC analysis indicated a number average molecular weight of 103,100 and a weight average molecular weight of 168,900 g/mol. The glass transition temperature of the block polymer was found to be 137° C. The block polymer was found useful as an E-Beam resist.

EXAMPLE 9

The procedure of Example 8 was repeated, except there were added 24.73 g of the $\alpha,\omega$-hydrogen functional polydimethylsiloxane oligomer having a molecular weight of 9894 g/mol and 4 ml toluene. The mixture was refluxed for one hour and cooled to 40° C. There were added 1.378 g bis(dimethylvinylsilyl)benzopinacolate followed by 8 $\mu$l platinum-siloxane catalyst. The mixture was heated at 40° C. for two hours. There were added 35 g 4-chlorostyrene and 15 ml toluene and the temperature raised to 100° C. Heating and stirring of the mixture was continued for 12 hours. The mixture was allowed to cool, dichloromethane was added and product was precipitated by pouring the mixture into methanol. The product was recovered by filtration and washed thoroughly with fresh methanol and dried for about 12 hours in vacuo at 60° C. There was obtained 50.9 g of the dry block polymer which amounted to a yield of 83.3%. NMR analysis indicated polydimethylsiloxane content of 55% and a poly-4-chlorostyrene content of 45%. The GPC gave a number average molecular weight of 99,700 and a weight average molecular weight of 155,300. The glass transition temperature was measured and found to be 118° C. The block polymer was evaluated and found to be useful as an E-Beam resist.

Although the above examples are directed to only a few of the very many variables which can be utilized in the practice of the method of the present invention, it should be understood that the present invention is directed to a method for making a much broader variety of silicone-organic block polymers as shown in the description preceding these examples and the silicone-organic block polymers obtained therefrom.

What I claim as new and desire to secure by Letters Patent of the United States is:

1. Silicone-organic block polymer comprising the reaction product of a free radical polymerizable organic monomer and a polydiorganosiloxane prepolymer having on its backbone, or in its terminal position, at least one chemically combined bissilylpinacolate radical capable of forming a free-radical initiator upon thermolysis.

2. A silicone-organic block polymer in accordance with claim 1 useful as an E-beam resist.

3. A silicone-organic block polymer in accordance with claim 1, where the free-radical polymerizable organic monomer is a halogenated free radical polymerizable organic monomer.

4. A silicone-organic block polymer in accordance with claim 3, where the halogenated free-radical polymerizable organic monomer is 4-bromostyrene.

5. A silicone-organic block polymer in accordance with claim 3, where the halogenated free-radical polymerizable organic monomer is 4-chlorostyrene.

* * * * *